(12) United States Patent  
Haegeman

(10) Patent No.: US 6,227,525 B1  
(45) Date of Patent: May 8, 2001

(54) DEVICE FOR MIXING AND AERATING LIQUIDS

(75) Inventor: Johny Hector Haegeman, Halle (BE)

(73) Assignee: Aquasystems International N.V., Halle (BE)

( * ) Notice: Subject to any disclaimer, the term of this patent is extended or adjusted under 35 U.S.C. 154(b) by 0 days.

(21) Appl. No.: 09/446,927

(22) PCT Filed: Jun. 24, 1998

(86) PCT No.: PCT/BE98/00096

§ 371 Date: Dec. 30, 1999

§ 102(e) Date: Dec. 30, 1999

(87) PCT Pub. No.: WO99/01386

PCT Pub. Date: Jan. 14, 1999

(30) Foreign Application Priority Data

Jun. 30, 1997  (BE) ................................... 9700564

(51) Int. Cl.[7] ...................................... B01F 3/04
(52) U.S. Cl. ............................... 261/84; 261/91
(58) Field of Search ................. 261/84, 87, 91, 261/93, 28, 29, 36.1

(56) References Cited

U.S. PATENT DOCUMENTS

| | | | |
|---|---|---|---|
| 2,072,944 | * | 3/1937 | Durdin, III .......................... 261/91 |
| 2,090,384 | * | 8/1937 | Durdin, III .......................... 261/91 |
| 2,530,814 | * | 11/1950 | De Becze et al. ................. 261/93 |
| 3,521,864 | * | 7/1970 | Welles, Jr. ......................... 261/93 |
| 3,572,658 | * | 3/1971 | Ravitts ............................... 261/93 |
| 3,650,950 | * | 3/1972 | White ................................. 261/93 |
| 3,865,721 | * | 2/1975 | Kaelin ................................ 261/93 |
| 3,865,909 | | 2/1975 | Cramer, Jr. . |
| 4,290,885 | | 9/1981 | Kwak . |
| 4,869,818 | | 9/1989 | DiGregorio et al. . |

FOREIGN PATENT DOCUMENTS

| | | |
|---|---|---|
| 527773 | 10/1972 | (CH) . |
| 366644 | 10/1989 | (EP) . |
| 2609459 | 7/1988 | (FR) . |
| 57-113891 | 7/1982 | (JP) . |
| 57-177394 | 11/1982 | (JP) . |

* cited by examiner

Primary Examiner—C. Scott Bushey  
(74) Attorney, Agent, or Firm—Hovey, Williams, Timmons & Collins

(57) ABSTRACT

The invention describes a device for treating liquids, in particular waste water, it being possible for the device both to aerate and mix the water. This device includes an aerator and includes a structure to which an independently working mixer is attached. The assembly may be attached to a float or be suspended above the liquid. Preferably, the mixer will be displaceably attached to the structure. The structure may be attached to the aerator or to the float.

18 Claims, 5 Drawing Sheets

DEVICE FOR MIXING AND AERATING LIQUIDS

BACKGROUND OF THE INVENTION

1. Field of the Invention

The invention relates to a device for treating liquids, in particular waste water, which comprises a surface aerator and also a mixer.

2. Prior Art

Aerators and mixers for treating waste water are known. By way of example, Belgian Patent BE 893,687 describes an aerator or mixer comprising a power source, attached to a float, which drives a shaft to which a screw pump is attached. In aerators of this type, the screw pump is usually surrounded by a water-guidance cylinder (pump housing), in which the water is pushed towards the surface of the water and is distributed over this surface. Below the screw pump, the pump housing may, for example, be shaped further to form a suction cone in order to promote the suction of water.

When treating waste water, it may be advantageous alternately to aerate the water (by introducing oxygen) and to mix the water (without the introduction of oxygen). The result is alternating processes of nitrification and denitrification which can be controlled as desired. In some cases, it may also be appropriate to aerate and mix simultaneously.

In deep pools, it is also possible to bring about simultaneous zones of aeration (nitrification) at the top and mixing (denitrification) at the bottom. If more than one unit is placed in a pool, it is possible to create different aeration zones and mixing zones which may be dimensioned and controlled in accordance with the requirements of the process.

Therefore it is not infrequently the case that a mixer is disposed fixedly in the pool, for example on the bottom of the pool or on a side wall, with the result that the two components are present as separate entities.

However, the fixed arrangement of a mixer in a pool is not an ideal solution, and such a mixer, if it is positioned on the bottom, is difficult to manipulate, to move or to maintain. For example, every manipulation requires additional material (bridge and hoisting crane) to be deployed. If the mixer is attached to the side wall of the pool, mixing is often limited to a specific zone and the desired mixing effect is not obtained. Especially in deep pools, it has been found that this arrangement does not allow an adequate mixing pattern to be achieved.

It has also already been proposed (for example in French Patent Application 87 00604) to lengthen the shaft of the aerator and to arrange a screw on this shaft in the pool, so that the appliance is simultaneously an aerator and a mixer.

However, such an apparatus has the drawback that the mixer and the aerator cannot function independently of one another and that, for example during a denitrification process, the aerator cannot be shut down. In other circumstances, it is not necessary for the mixer to function continuously together with the aerator in order, for example, to keep the particles in suspension. In many cases, it may be advantageous for the mixer and the aerator to be able to function alternately. Moreover, with regard to efficiency it is advantageous to save the power required to drive the mixer if mixing were to be unnecessary or disadvantageous for treating the water.

It is to be noted that U.S. Pat. No. 3,865,909 describes an aerating device having a submersible motor supported by a float member and a propeller which propels the water upwardly against a diffuser. This apparatus can be arranged to carry a second motor and propeller to move the water upwardly from deeper depths and thus to improve the action of the main submersible motor. However, this device does not create different aeration and mixing zones and both propellers do not function independently of one another to allow the creation of either a nitrification and/or a denitrification process. Furthermore, this device does not constitute an efficient and economic aeration process as the power source is situated under water and in the absence of a guidance housing can not create a strong upward movement of the water.

SUMMARY OF THE INVENTION

The object of the invention is to propose an apparatus, device or appliance which comprises both a mixer and an aerator which are able to operate independently of one another, with the result that the apparatus offers more possibilities than a dual-purpose appliance which can only either aerate or mix in the same pool or pool zone.

The device according to the invention comprises a surface aerator which draws in liquid and distributes it over the surface of the liquid, as well as a structure which extends beneath the surface of the liquid and to which at least one mixer is attached, which mixer functions independently of the aerator.

The result is a surface aerator and a mixer which form a single unit and can easily be moved as a unit, but in which the two components can operate either separately or together.

Such a device makes it possible to obtain a mixing pattern which is adapted to the volume of the pool, the pool geometry and the requirements of the treatment process.

Thus such a device can also be used to carry out simultaneous nitrification and denitrification in the same pool, if the water circulation of the aerator and the mixer are controlled in such a manner that the two flows have little or no effect on one another.

Thus the device according to the invention makes it possible to employ only surface aeration or only a mixing action, or to employ both functions together. By introducing air or oxygen in the vicinity of the mixer, it is also possible to bring about bottom aeration.

According to one embodiment of the invention, the device may be positioned on a float, the aerator being attached to the float and the float or one of the components of the aerator comprising the structure to which the mixer is attached. The float may be assembled from one or more floats.

According to a further embodiment, the apparatus may be attached fixedly or movably above the pool.

According to a preferred embodiment, the mixer is displaceably attached to the structure, so that the mixer can be displaced vertically. It is also possible to make the orientation of the mixing member of the mixer changeable, so that it is possible to obtain a mixing pattern in all possible directions.

It is also possible to position the mixer eccentrically with respect to the aerator. In this arrangement, all other positions are possible, such as vertical adjustment and changeable orientation. If, in this case, the device is placed on a float, the float must always be dimensioned so as to ensure the stability in all embodiments.

BRIEF DESCRIPTION OF THE DRAWINGS

The invention is described in more detailed below using a series of non-limiting examples and with reference to the appended drawings, in which

FIG. 5 shows a variant of FIG. 1, in which the float comprises various components.

DETAILED DESCRIPTION OF THE EMBODIMENTS

Figure 1:
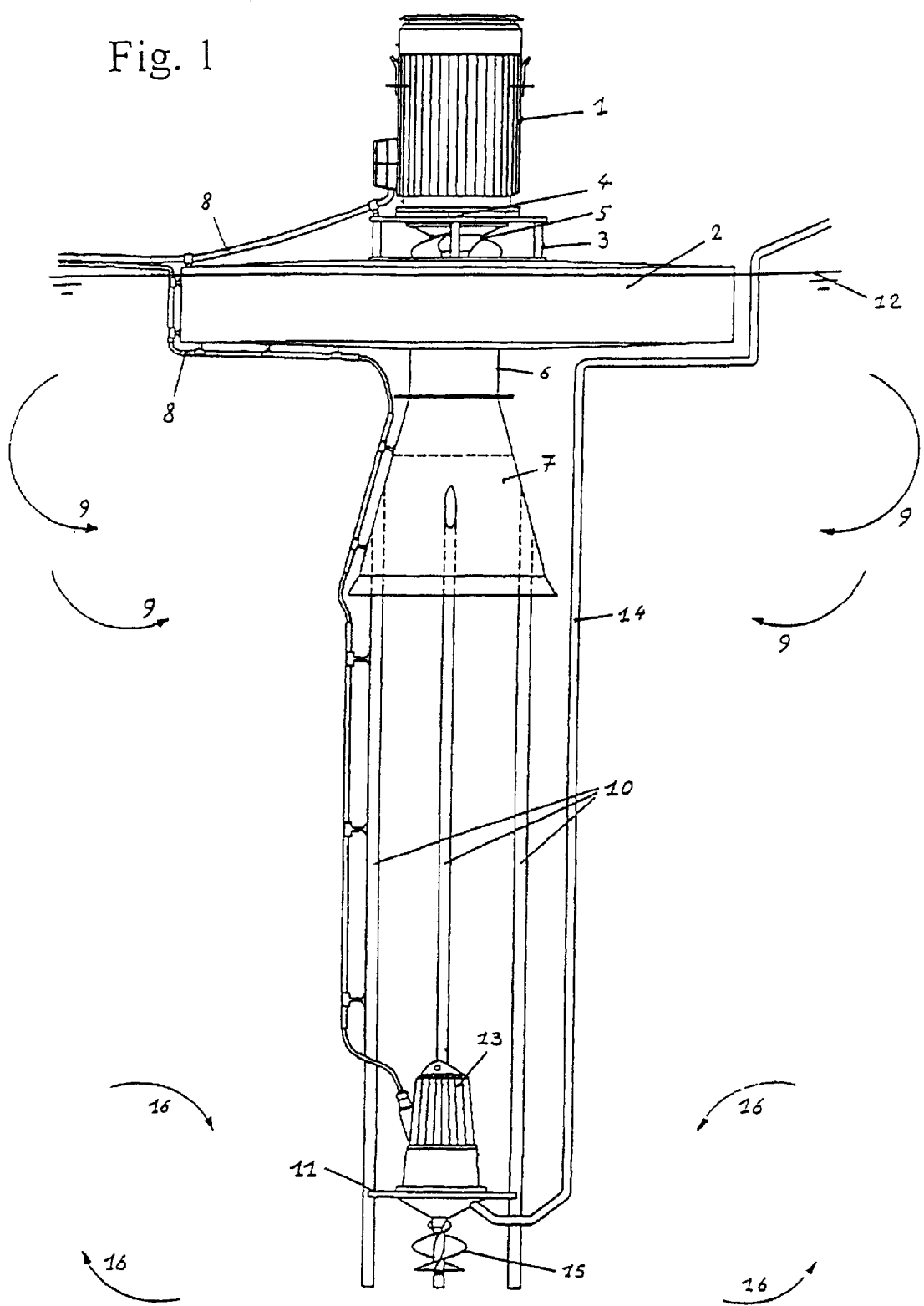
FIG. 1 shows a diagrammatic front view of an aerator on a float, the aerator comprising a structure to which a mixer is attached, with the mixing member directed towards the bottom of the pool.

In order to keep the description simple, all the figures show the same type of surface aerator and the same type of mixer, and identical components are denoted by identical reference numerals throughout the various figures. Obviously, it is possible according to the invention to use any other type of aerator and any other type of mixer.

The surface aerator described in the examples is of the type having a centrifugal screw impeller and the described agitator of the mixer is in screw form. This type is known primarily for the good mixing and aeration pattern which is obtained with a helical member by comparison with, for example, a propeller.

Figure 2:
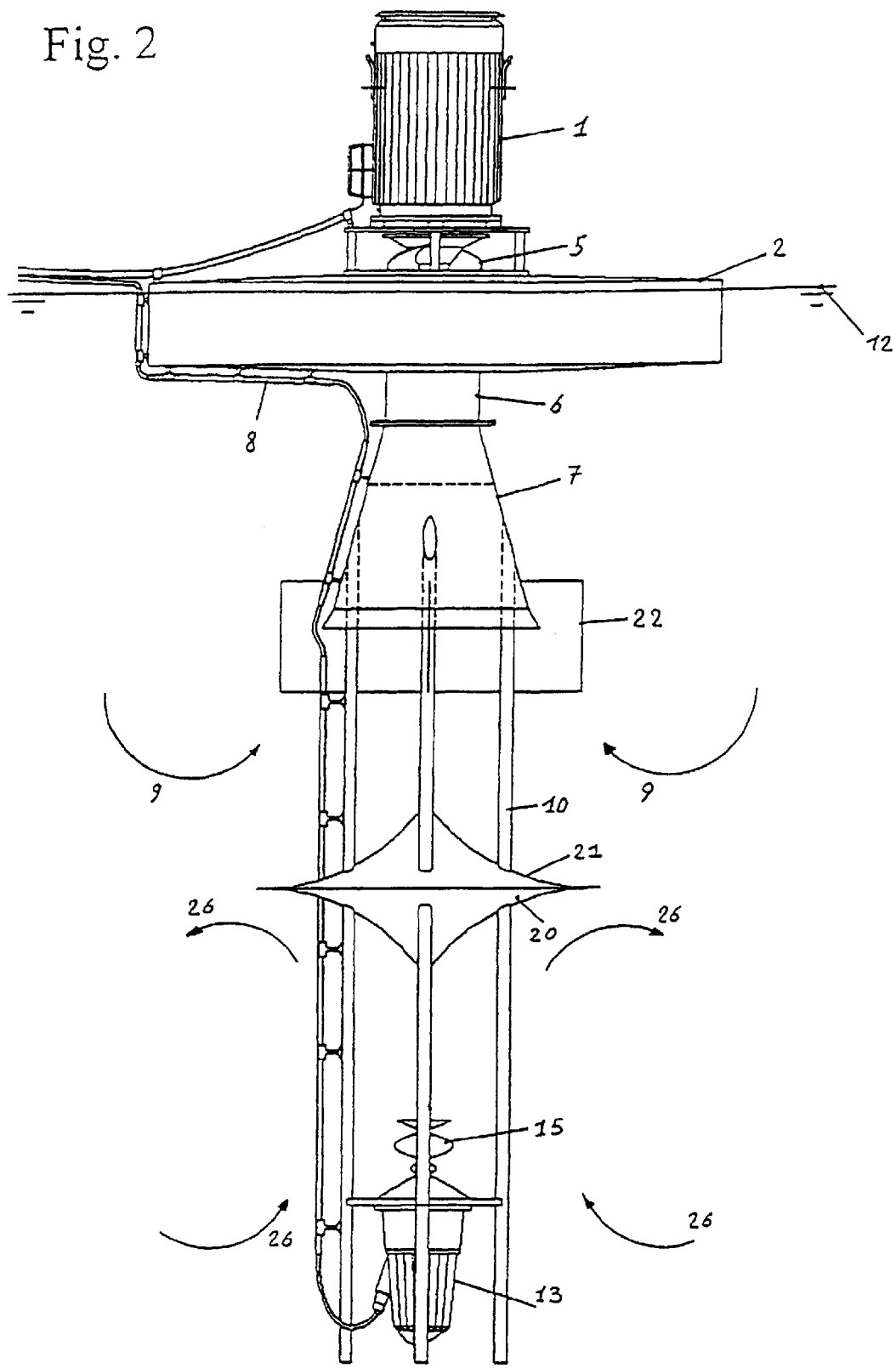
FIG. 2 shows a variant of FIG. 1, but with the mixing member directed towards the surface of the water.
Figure 3:
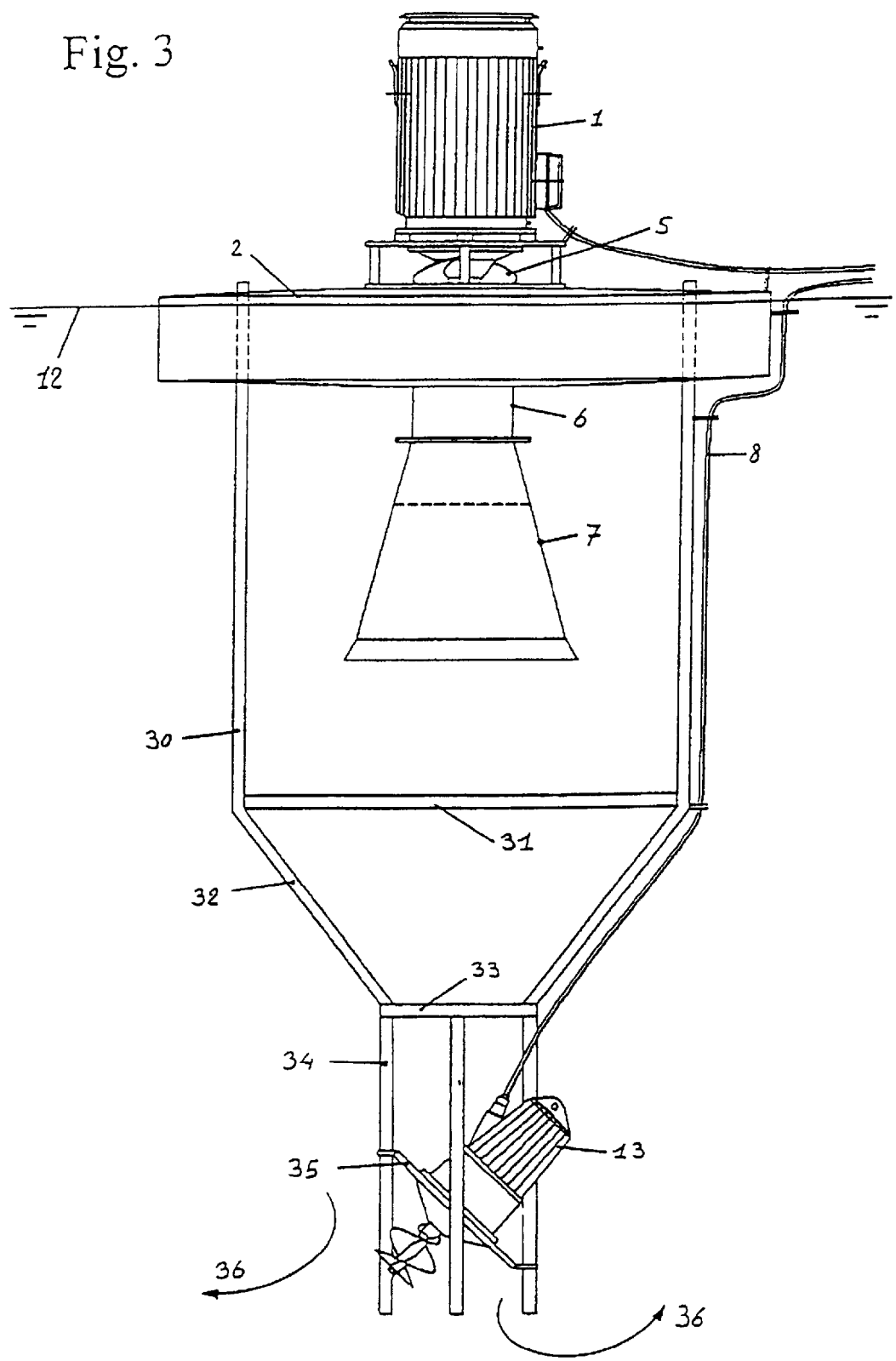
FIG. 3 shows a variant of FIG. 1, where the structure with the mixer is supported by the float and where the mixer is directed at an angle with respect to the surface of the water.

The apparatus in accordance with the examples of FIGS. 1 to 3 comprises an aerator which comprises a power source or motor 1, which is mounted on a float 2. The water surface is indicated by the reference numeral 12. Via an intermediate flange piece 3, the shaft 4 of the motor 1 drives a centrifugal screw impeller 5. This impeller 5 is surrounded by a water-guidance cylinder or pump housing 6. This pump housing 6 is extended by a suction cone 7. The movement of the water created by the aerator is indicated by the arrows bearing reference numeral 9.

Figure 4:
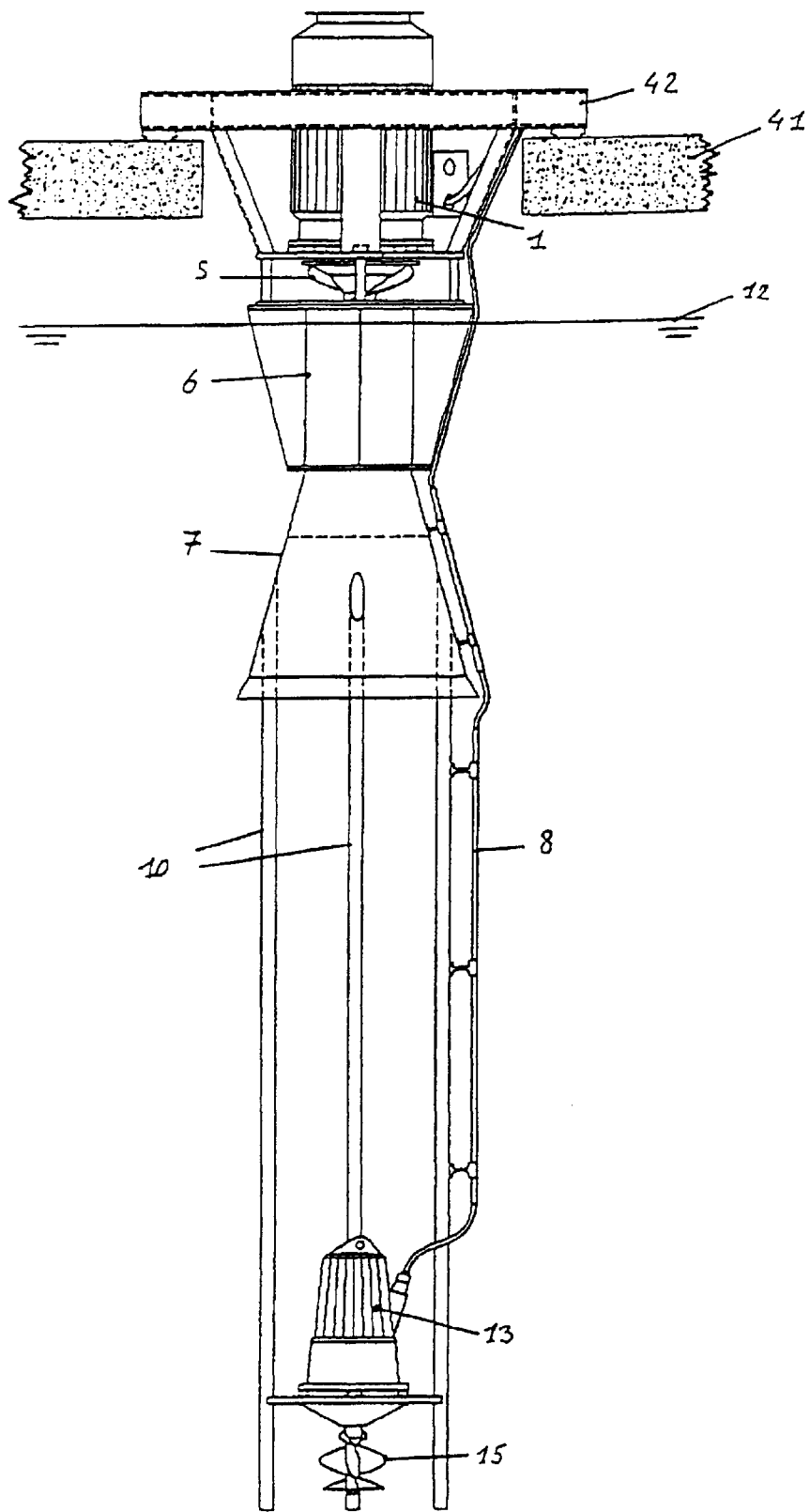
FIG. 4 shows a variant of FIG. 1, but in which the aerator is attached to a fixed suspension system instead of to a float.

The appliance in accordance with FIG. 4 comprises the same aerator, but is not mounted on a float, but rather attached to a fixed suspension system 42.

With reference to FIG. 1, this figure shows four structural tubes 10 (three of which can be seen on the drawing) which are attached to the inner wall of the suction cone 7. These structural tubes 10 support a structural component 11 to which a mixer 13 is attached. The motor of this mixer 13 is powered via drive cable 8 and the shaft of the motor drives a screw 15.

The movement of the water created by the screw 15 is indicated by the arrows bearing reference numeral 16.

The apparatus is therefore a combination of aerator and mixer, in which both the aerator and the mixer can operate independently, but in which the unit can be displaced as a whole inside the pool, is easy to maintain and in which the mixer can operate at any level in the pool.

Reference numeral 14 shows a line through which air or, if appropriate, oxygen can be guided to the zone in the vicinity of screw 15 of the mixer.

FIG. 2 shows a variant of the appliance in accordance with FIG. 1, in which the screw 15 of the mixer 13 is directed towards the surface of the water, resulting in an inverse pattern of movement of the water, as indicated by the arrows bearing reference numeral 26. This pattern may be further affected by arranging a trumpet-shaped diffusion element 20 above the screw 15, which diffusion element may be attached, for example, to the structural tubes 10.

It may also be advantageous to provide a diffusion element 21, allowing the pattern of movement 9 of the water to be improved in the vicinity of the centrifugal screw impeller. This is useful, for example, if a stabilizing cross 22 is attached to the aerator beneath the suction cone 7, thus interrupting the rotation of the water in the suction cone 7.

FIG. 3 shows a variant of the appliance in accordance with FIG. 1, in which the float 2 bears structural components 30 (31, 32, 33, 34, 35) which support the mixer 13. According to this embodiment, the mixer is disposed in such a way that the screw 15 is oriented sideways, and as a result the pattern of movement of the water, indicated by the arrows bearing reference numeral 36, is also different. If it is necessary for the mixer 13 to be adjustable in terms of depth, it is simple according to this embodiment to provide structural components 30 in such a way that they are arranged adjustably on the float. For example, they may be of extendable or telescopic design. In a particular embodiment, it will be ensured that structural support 35 is adjustable, movable or exchangeable, so that both the height of the mixer and its orientation can easily be adapted to the pool and/or the waste water to be treated.

In this arrangement, the mixer causes an advancing movement. Therefore, in most cases it will be recommended to stabilize the float, for example using cables or by means of a stabilizing float. It is also possible to use the advancing movement of the mixer to move the device around the pool, for example around a fixed point.

FIG. 4 shows the appliance in accordance with FIG. 1, with the float 2 replaced by a suspension system 42 which rests an a fixed structure 41.

Figure 5A:
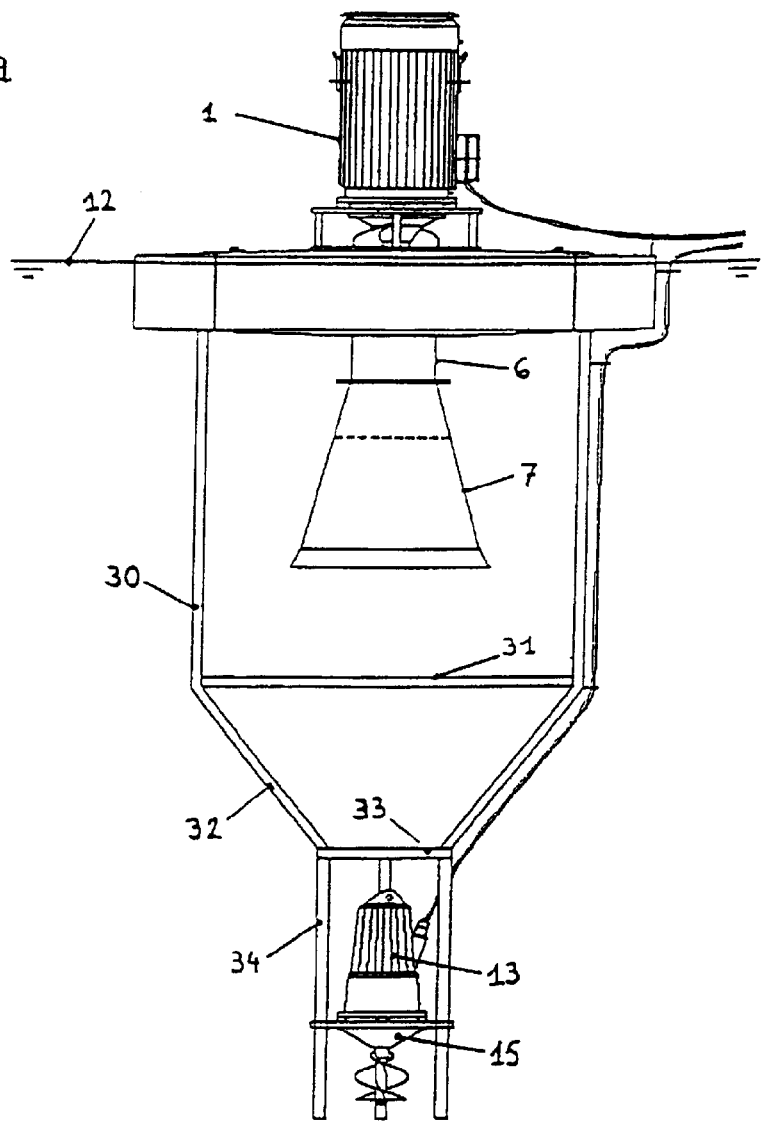
FIG. 5a shows a diagrammatic front view and FIG. 5b shows a diagrammatic plan view.
Figure 5B:
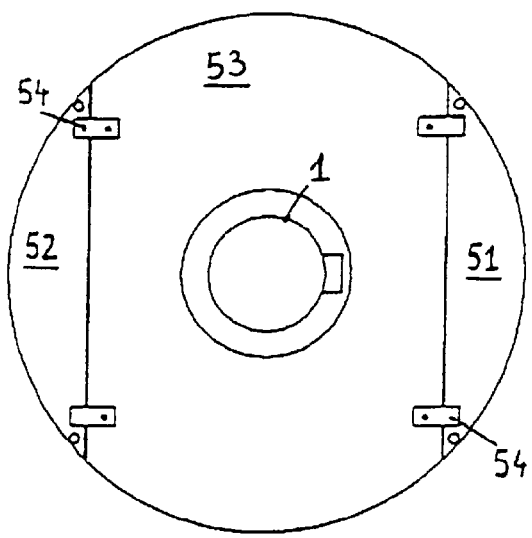

FIG. 5 shows the appliance in accordance with FIG. 1, but with the float bearing the structural components (as in FIG. 3) which support the mixer. According to this example, the float comprises three detachable parts (51, 52 and 53). Parts 51 and 52 each comprise two connecting elements 54, which can be attached to part 53. The aerator is supported by float element 53 and the structure which supports the mixer is held by float components 51 and 52. The result is an integrated aerator/mixer in which the mixer can be separated from the aerator and they can be used as two independent floating appliances.

It is clear that line 14, which is shown in FIG. 1, can also be provided in the embodiments in accordance with the other examples and that air or oxygen can be delivered to the vicinity of the mixer under pressure or by self-priming.

The appliances described also make it possible to further affect the rotational movement of the water by specifically matching the rotational movement of the mixing member 15 and of the centrifugal screw impeller 5 to one another.

It is clear from the above examples that a device according to the invention can be used to position the mixer at any desired location in the pool. Thus it is possible not only to control the geographic location in the pool, but also to adapt the depth at which the mixer is to act. It is clear that the structural components which support the mixer may be designed in such a way that the mixer can be placed at different levels. It is also possible to specify the mixing pattern of the mixer as a function of the liquid and/or the geometry of the pool. By positioning the screw of the mixer at any possible angle with respect to the surface of the water or with respect to any desired vertical plane in the pool, whether upwards, downwards, sideways or in any direction whatsoever, it is always possible to obtain the optimum pattern of movement of the water. If necessary, the suspension structure of the mixer will be designed in such a way that it is vertically adjustable.

It is clear that, according to the invention, it is possible to attach more than one mixer to the structure under water, which also allows the pattern of movement of the water to be affected.

Furthermore, it is possible to position various devices in large pools and to allow these to interact completely or partially. Thus it is possible, for example, to obtain a special effect by allowing only the aerators of some devices and only mixers of other devices to operate. Such a manner of interaction makes it possible to obtain a specific and/or optimum pattern of movement of the water, the interaction also allowing power-saving operation.

It is also clear that the mixing member of the mixer does not necessarily have to be a screw, but that any other type of agitator, such as for example a wheel, a dish, a propeller, etc., may be used according to the invention.

It is also possible, according to the invention, for the type of aerator described in the examples to be replaced by any other type of aerator.

Finally, it is also possible to support the device on more than one float, in which case the various floats may, if appropriate, interact in order to ensure the stability of the assembly.

What is claimed is:

1. Device for treating liquid, by creating in the liquid zones with different movement whereby said zones can be dimensioned and controlled in accordance with the requirements of the treatment process, comprising:

a surface aerator including a power source placed above the liquid surface and driving a shaft extending into the liquid and equipped with an impeller, at least partly surrounded by a guidance housing, which sucks liquid upwards and distributes it over the liquid surface;

at least one mixer comprising a motor driving a shaft equipped with an impeller whose orientation in the water can be changed; and a structure which extends beneath the surface of the liquid and to which said at least one mixer is attached, which functions independently of the aerator.

2. Device according to claim 1, wherein the structure is attached to the aerator.

3. Device according to claim 1, wherein the aerator is positioned on a float, and in that the structure with the mixer is attached to the float.

4. Device according to claim 1, wherein the mixer is arranged displaceably on the structure.

5. Device according to claim 4, wherein the mixer is arranged vertically displaceably on the structure.

6. Device according to claim 1, wherein the device is attached to a suspension system which is positioned above the liquid to be treated.

7. Device according to claim 1, wherein the guidance housing of the aerator comprises a suction cone, and in that the structure with the mixer is attached to the suction cone.

8. Device according to claim 3, wherein the float comprises two or more releasable parts, and in that the aerator and the structure are not attached to the same part of the float.

9. Device according to claim 1, wherein the structure comprises a diffusion element for adapting the pattern of movement of the liquid.

10. Device according to claim 2, wherein the mixer is arranged displaceably on the structure.

11. Device according to claim 3, wherein the mixer is arranged displaceably on the structure.

12. Device according to claim 2, wherein the structure comprises a diffusion element for adapting the pattern of movement of the liquid.

13. Device according to claim 3, wherein the structure comprises a diffusion element for adapting the pattern of movement of the liquid.

14. Device according to claim 4, wherein the structure comprises a diffusion element for adapting the pattern of movement of the liquid.

15. Device according to claim 5, wherein the structure comprises a diffusion element for adapting the pattern of movement of the liquid.

16. Device according to claim 6, wherein the structure comprises a diffusion element for adapting the pattern of movement of the liquid.

17. Device according to claim 7, wherein the structure comprises a diffusion element for adapting the pattern of movement of the liquid.

18. Device according to claim 8, wherein the structure comprises a diffusion element for adapting the pattern of movement of the liquid.

* * * * *